United States Patent [19]

Boyer

[11] Patent Number: 4,657,289

[45] Date of Patent: * Apr. 14, 1987

[54] ORBITAL ELECTRICAL POWER AND SIGNAL GENERATOR MOUNTABLE ON A ROTATABLE BODY

[76] Inventor: Robert E. Boyer, 2650 Davisson St., River Grove, Ill. 60171

[*] Notice: The portion of the term of this patent subsequent to Aug. 20, 2002 has been disclaimed.

[21] Appl. No.: 767,136

[22] Filed: Aug. 19, 1985

[51] Int. Cl.⁴ .......................... H02P 9/04; H02K 7/10
[52] U.S. Cl. ................................ 290/1 R; 310/75 R; 310/89; 310/90
[58] Field of Search ........... 290/1 R; 310/67 A, 67 R, 310/75 R, 75 C, 77, 89, 90; 235/95 R, 95 A, 95 B, 95 C; 340/58; 74/752 F; 200/83 B, 83 N, 83 W, 83 V

[56] References Cited

U.S. PATENT DOCUMENTS

| 2,638,274 | 5/1953 | Engler | 235/95 C |
| 3,482,129 | 12/1969 | Riordan | 310/75 R |
| 3,489,935 | 1/1970 | Hayes | 310/75 R |
| 3,860,772 | 1/1975 | Byrd | 200/83 W X |
| 4,405,872 | 9/1983 | Thomas | 290/1 R X |
| 4,429,232 | 1/1984 | Thomas et al. | 290/1 R |
| 4,536,668 | 8/1985 | Boyer | 310/75 R |
| 4,539,497 | 9/1985 | Boyer | 310/75 R |

Primary Examiner—Patrick R. Salce
Assistant Examiner—Emanuel Todd Voeltz
Attorney, Agent, or Firm—Leo J. Aubel

[57] ABSTRACT

An electrical power and signal generator and sensing device mountable on a rotatable body, such as a vehicle wheel, oribiting around its axis and using the rotation of the wheel to drive the generator through a friction drive.

30 Claims, 14 Drawing Figures

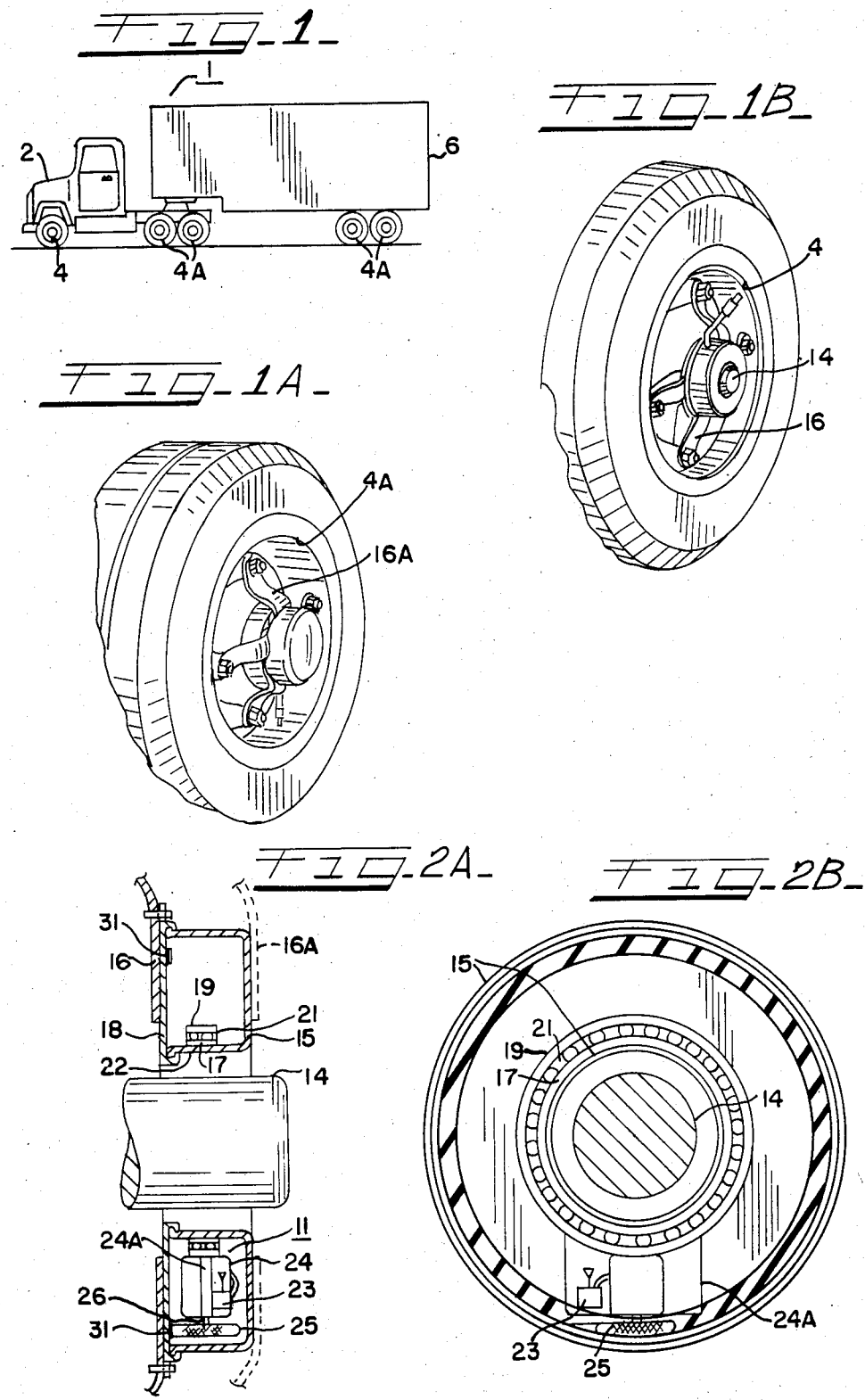

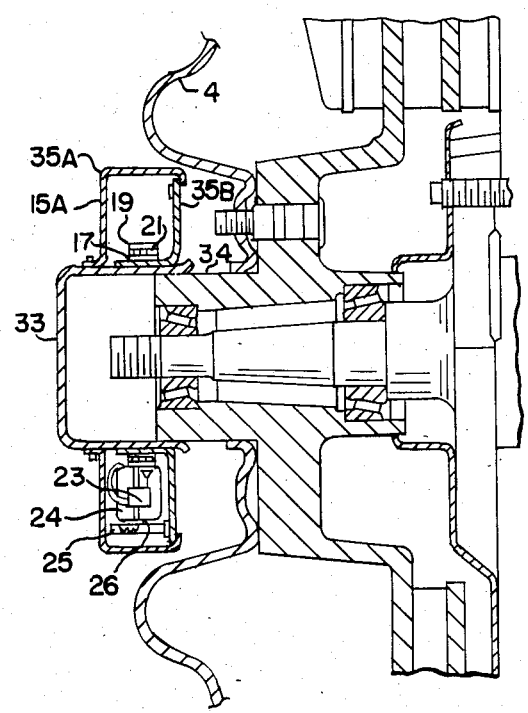
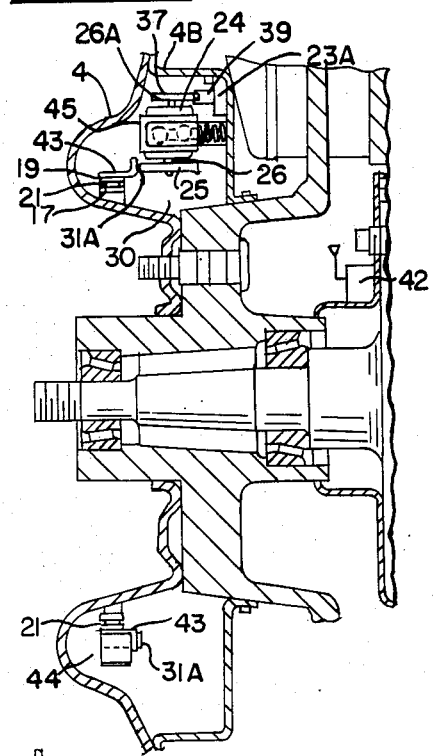
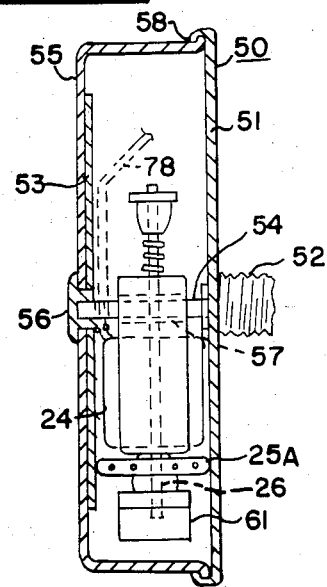
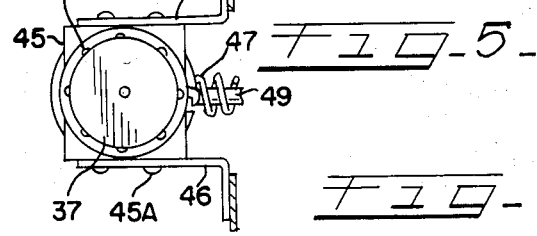
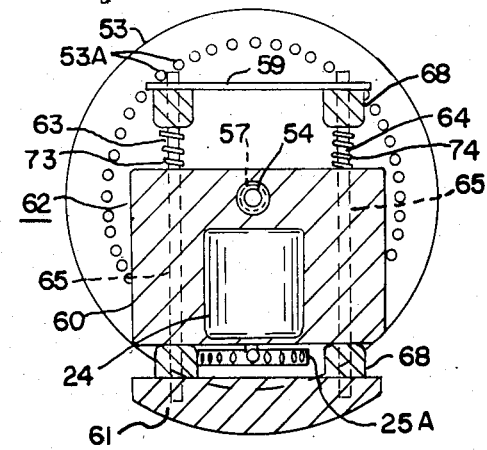

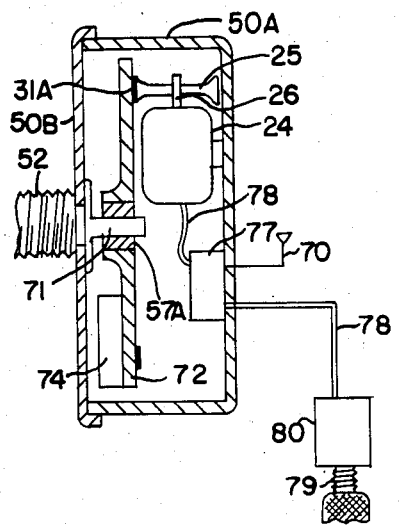
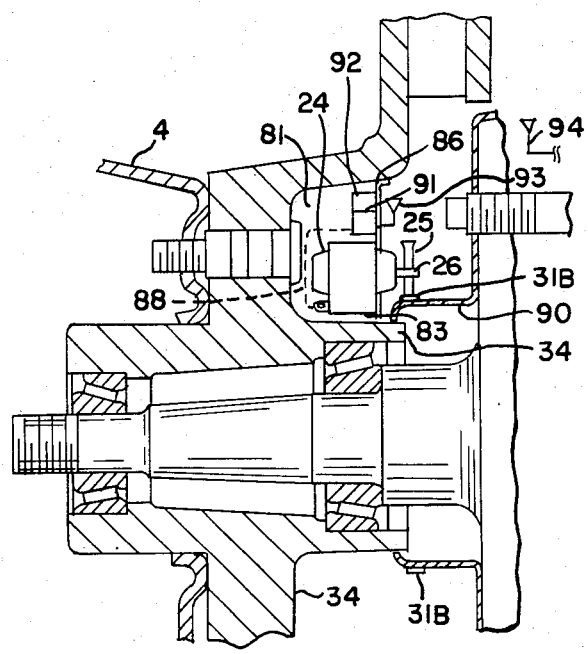
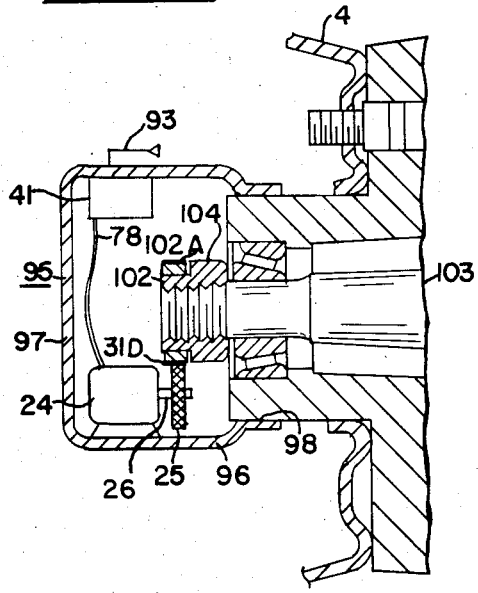
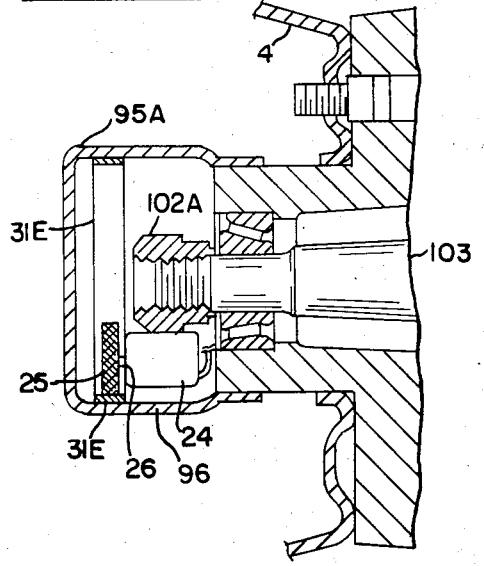

ORBITAL ELECTRICAL POWER AND SIGNAL GENERATOR MOUNTABLE ON A ROTATABLE BODY

DESCRIPTION

1. Technical Field

An electrical power and signal generator mountable on a rotatable body, such as a vehicle wheel, and rotatable therewith around an axis generating electrical power for energizing devices, and for providing transmission of information indicating various conditions of said rotatable body.

2. Background of Invention

The present application is related to a patent application of Robert E. Boyer, Ser. No. 417,473, filed Sept. 13, 1982 now U.S. Pat. No. 4,536,668 and entitled "Vehicle Mountable Electrical Generating System", and is also related to a second patent application of Robert E. Boyer, Ser. No. 483,710, filed Apr. 11, 1983 now U.S. Pat. No. 4,539,497 and entitled "Electrical Generator With Ring Housing Mountable On A Wheel Assembly." The disclosures of both said patent applications are specifically incorporated herein by reference.

The monitoring of various conditions of a vehicle tire and wheel has been a goal of the automotive industry for many years. That industry has spent much time in trying to develop reliable, low cost, easily installed and easily maintainable devices to monitor conditions that develop in wheels and tires during operation; and to develop effective systems and methods of transferring that information to the body of the vehicle.

A limitation has been that known electrical generating devices mounted on vehicle wheels could not produce enough power to maintain a continuous and effective transmission of information. Instead many of these devices accumulated trickle power for single periodic transmissions and could not be relied upon to be fail-safe, such as to report a tire condition continuously. Also, the slow rotation of a wheel of a vehicle traveling at slow speeds did not enable the generation of enough power to provide a constant and consistent power to an associated transmitter to assure proper transferral of information to the body of the vehicle.

Various prior art devices used batteries as the power source but were not reliable. Changes in temperature and humidity result in unknown battery life; in addition, batteries are inconvenient to replace.

Other prior art wheel mounted electrical generators have a stator held relatively stationary by a weighted pendulum while a rotor rotates with the wheel. These latter devices also could not produce enough electrical energy at slow wheel speeds. Other prior art devices used piezoelectric crystals for monitoring purposes; however, such devices sensed only malfunction or failure and did not sense or register when the associated device was operating correctly.

Still other prior art systems relied upon magnetically active components mounted on and rotating with the wheel and passing in close spaced proximity to an associated magnetically responsive component mounted on the body of the vehicle. These latter systems were subject to malfunctioning due to adverse conditions such as poor wheel alignment, road debris, ice and snow; and also because of the difficulty of maintaining a workable gap between the rotating and non-rotating components.

SUMMARY OF THE INVENTION

The present invention utilizes an electrical generator that rotates in a designated path around an axis of a rotatable body. A driven wheel is used to turn the armature shaft of the generator to thereby produce an electrical potential. The diameter of the driven wheel is smaller than the circumferential path in which it travels, and thus effects an overspeed relationship with respect to the rotatable body such as a vehicle wheel. The ratio of the diameter of the friction driven wheel compared to the diameter of the circular path in which the friction driven wheel travels, provides accelerated revolutions of the generator rotor to produce ample power for the devices it operates. This power supply is sufficient to allow for a fail-safe system, that is, it will provide ample power to a suitable device sending both positive and negative information to a designated receiving station, usually on the body of the vehicle.

Another important feature of the inventive system is that the system is capable of counting rotations or revolutions, and transmitting that information, thereby functioning as a speedometer, an odometer, or as a wheel speed sensor exciter assembly for use in anti-lock or anti-skid braking systems.

A wheel speed sensor and exciter assembly is one of the important components of an anti-skid or anti-lock braking system and function together to generate a wheel speed signal. The output of the wheel sensor and exciter is generally coupled to a computer module, of known design. The computer module processes the wheel speed information from the two wheel speed sensors on the axle and controls both brakes on the axle simultaneously. The computer module determines when wheel lockup is about to occur and energizes the air anti-lock relay valve accordingly. The anti-lock relay valve, also of known design, receives the signal from the computer module and adjusts air pressure in the brake chambers.

The counting of rotations can be cumulative and is also useful such as to indicate maintenance required when enough pre-selected rotations have been attained. For example, the total rotations can indicate when lubrication oil changes, filter changes, tune up, and check brake lining, etc. are needed. Such information can be visually displayed to the vehicle operator, as is known. Also, the inventive system can power those devices which monitor the wheel stability and provide an indication that a wheel alignment is necessary.

DESCRIPTION OF THE DRAWINGS

FIGS. 1, 1A and 1B show a vehicular environment in which the present invention is used. In particular, FIG. 1A shows how one embodiment, such as that of FIG. 6 is mounted on wheel 4 using mounting bracket 16A.

FIG. 1B shows another embodiment of the ring shaped generator housing, see FIGS. 2A and 2B, which are mounted to wheel 4 by mounting bracket 16 and surrounding axle 14.

FIG. 2A is a side view, partially in cross section, of one embodiment of the invention;

FIG. 2B is a front view, partially in cross section of the embodiment of FIG. 2A;

FIG. 3 shows the embodiment of FIG. 2 mounted on a grease cap;

FIG. 4 shows another embodiment of the invention mounted on the inner side of a wheel comprising an electrical generator and revolution counter which may be utilized as a wheel speed sensor;

FIG. 5 shows a top view of the revolution counter/sensor part of the structure of FIG. 4 showing additional details thereof;

FIG. 6 shows a side view partially in cross section of another embodiment of the invention including a damping device and sprocket drive;

FIG. 7 shows a front view of the structure of FIG. 6;

FIG. 8 shows a brushless embodiment of the invention;

FIG. 9 shows an embodiment of the invention wherein the generator is mounted within the brake assembly housing;

FIG. 10A shows the inventive generator mounted within the grease cap area; and,

FIG. 10B shows a modification of the structure of FIG. 10A.

DETAILED DESCRIPTION

As mentioned above, the present invention comprises a device which may be mounted on a rotating body such as the wheel of a vehicle. FIG. 1 of the drawings, generally disclose the vehicle environment for the present invention, and more particularly a semi-trailer truck, generally designated by reference number 1. As is common, vehicle 1 has a tractor or cab 2, with two steerable wheels 4 under the cab 2 and sets of dual wheels 4A supporting the tractor 2 and another set supporting the trailer 6.

FIG. 1A shows one embodiment of the inventive system mounted on a vehicle wheel, as for example, wheel 4A, and positioned adjacent the end of the associated axle. FIG. 1B shows another embodiment of the inventive system, mounted on a vehicle wheel 4 in co-axial relation with the associated axle 14.

Note herein, that in the drawings, like reference characters in the various figures refer to like elements.

In the embodiment of the invention as shown in FIGS. 2A and 2B as well as in FIG. 1B, the inventive generator assembly 11 comprises a ring-shape housing 15 that surrounds an axle 14 and permits the housing 15 to be mounted by suitable brackets 16 and 16A either inboard or outboard of the associated wheel 4. As best seen in FIG. 2A, the housing 15 is cup-shaped in cross section with the open side of the cup facing vertically, and suitably affixed to and sealed by a cover 18, which forms the inward wall of the housing 15. The brackets 16 coaxial mount the housing 15 in position to surround axle 14, and in normally spaced position with the axle.

An inner race 17 of a conventional ring bearing 21 is affixed to the inner wall 22 of housing 15. A conventional electrical potential generator 24 having a conventional stator and rotor is fixedly attached to a weighted holding bracket 24A which is fixedly attached to the outer race 19 of bearing 21 and hangs suspended therefrom substantially as a pendulum.

The generator 24 is equipped with a driven wheel 25 attached to a generator armature shaft 26. The cover 18 forming the inward wall of housing 15 has a track or ring 31 made of resilient material such as rubber, affixed thereto. The driven wheel 25 is in operative friction engagement with ring 31. Note that the periphery of the driven wheel 25 may be knurled to obtain better friction contact with ring 31. As the wheel 4 and housing 15 rotate, friction driven wheel 25 is rotated, by its engagement with drive ring 31, at a sufficiently high speed to cause the generator 24 to produce a substantial electrical potential. Note that generator 24 remains relatively stationary, that is, it does not rotate with wheel 4 or housing 15. The friction driven wheel 25 is of a smaller diameter than the diameter of the path or track of the circular ring 31 in which it rotates. Thus, the friction driven wheel 25 provides an overspeed relation as compared to the rotating vehicle wheel 4.

A suitable signal transmitter 23 may be mounted on holding bracket 24A and connected to receive electrical power from the generator 24. The essentially stationary generator 24, generator holding bracket 24A and transmitter 23 permit power to be coupled therebetween without the need for conventional brushes. Note, also that transmitter 23 may be mounted at various positions within housing 15 other than as shown. If transmitter 23 is mounted on housing 15 and is to be rotating, slip rings or brushes, as is well known, may be utilized to make the electrical connections. The position of the transmitter 23 may depend on the positioning of the sensors which monitor the desired functions as discussed above.

In another embodiment of the invention as shown in FIG. 3, a ring-shaped housing 15A, generally similar to housing 15, is coaxially mounted on a grease cap 33 which is force fitted onto the brake rotor hub 34 of the vehicle wheel 4 and rotates therewith.

The ring housing 15A is formed of two L-shaped, generally circular, segments 35A and 35B positioned and mounted in juxtaposed position on cap 33 to provide an enclosed circular toroidal housing. The other components shown in FIG. 3 are positioned and mounted in a generally similar manner to the corresponding components shown in FIGS. 2A and 2B. Also the embodiment of FIG. 3 operates in the same manner and obtains the same results as the structure of FIG. 2A and 2B.

In another embodiment of the invention, as shown in FIGS. 4 and 5, the generator 24 is mounted on the inside of a vehicle wheel 4 within the annular cavity 30 created by the conventional strengthening rib fabricated into wheel 4. The generator 24 being fixedly attached to a ring shaped shroud 4B which encloses the cavity 30 similarly as for the structure of FIGS. 2A and 2B. The generator 24 has a friction driven wheel 25 attached to the armature shaft 26. However, in this embodiment, the armature shaft 26 also extends upwardly at the top end of the generator 24 as at 26A, and a counting wheel/exciter 37 is mounted on the upwardly extending end 26A of the armature shaft 26. The counting wheel/exciter 37 is equipped with multiple periodic protrusions 38, see FIG. 5, on its circumference which are sensed by a suitable sensor/counter 39 of known design. With each revolution, the counter 39 senses the rate of rotational speed of protrusions 38, and sends this information to a transmitter 23A coupled to said counter 39 which, in turn, transmits this information to an associated receiver 42 mounted on a stationary part of the vehicle body. As mentioned, herein above, the transmitter 23A and the sensor/counter 39 receive their electrical power from generator 24.

As discussed in some detail herein above, the signal or pulse count and the rate of pulse count is an important input to an anti-skid braking system. The signal or pulse count is also useful in any system requiring a cumulative count input.

The periphery of friction driven wheel 25 frictionally engages a resilient drive ring 31A mounted as by an L-shaped bracket 43 that is fixedly attached to the outer race 19 of circular bearing 21, similarly as described above. A weight 44 is suitably attached to bracket 43 to function as a pendulum weight and maintain the bracket 43, outer race 19 and drive ring 31A in a non-rotating condition. The inner race 17 of the bearing 21 is fixedly attached to the inside of the strengthening rib of the vehicle wheel 4 and rotates therewith. Hence, as the vehicle wheel 4 rotates, the driven wheel 25, which is in engagement with the ring 31A, is caused to rotate. The driven wheel 25 is of a smaller diameter that the circular path it travels on the drive ring 31A thereby effecting an overspeed relative to the rotation of the vehicle wheel 4.

The generator 24 is supported by holding bracket 45 which is fixedly attached to ring shaped shroud 4B. The generator 24 and the friction drive wheel 25 are firmly pressed against drive ring 31 by means of a compression spring 47 which is piloted and held in place by pilot pin 49 which is fixedly attached to shroud 4B.

In another embodiment of the invention, and as shown in FIGS. 6 and 7, generator 24 is enclosed in a cylindrical housing 50 consisting of a cup shaped cover 55 and a rear wall 51 that is mounted on wheel 4, brackets 16A (see FIG. 1A) as by mounting stud 52. A shaft 54 which is affixedly and centrally attached to rear wall 51 and supported by a centrally located supporting stud 56 affixed to cup shaped cover 55. Housing 50 is mounted in coaxial relation with the associated wheel and rotates therewith. A conventional bearing 57 is attached to generator support platform 60 and in slideable communication with shaft 54. A pendulum weight 61 and a damping mechanism 62 which includes platform 60 that supports generator 24 in a downwardly oriented position from bearing 57. The damping mechanism is similar to that shown in U.S. Pat. No. 2,638,274 to H. G. Engler. A flat bar 59 positions two slideable rods 63 and 64 that extend through passage holes 65 in the platform 60. The rods 63 and 64 support the arc-shaped pendulum weight 61 on the lower end of the rods. Resilient bumpers 68 encircle the rods 6 and 64 at both ends, and compression springs 73 and 74 surround the rods 63 and 64 between the upper part of the platform 60 and the top bumpers 68. The pendulum weight 61 holds the generator 24 and the damping mechanism 62 in a substantially non-rotating condition. The damping mechanism 62 assures that there is minimal oscillation of the assembly due to motion of the associated vehicle.

Somewhat similarly to the apparatus described above, a driven wheel 25A attached to the armature shaft 26, is in operative contact with a multi-holed sprocket drive gear 53. Driven wheel 25A has conventional teeth to engage the sprocket holes 53A of gear 53; and, as the sprocket gear rotates with housing 50, driven wheel 25A is rotated and causes rotation of the generator armature to develop an electrical potential. The driven wheel 25 is of a smaller diameter than the multi-hole diameter of the sprocket gear 53 in which it travels, to thereby create an overspeed relation with respect to the rotating vehicle wheel. The output of the generator is electrically connected to suitable devices as by leads 78.

In another embodiment of the invention, as shown in FIG. 8, a two piece cylindrical casing on housing 50A, generally similar to housing 50 of FIG. 6, houses the generator 24 assembly. Housing 50A is coaxially bolted to the rotating vehicle wheel by stud 52, and the housing rotates with the wheel. A central shaft 71 is suitably affixed to rear wall 50B of housing 50A, coaxially in line with screw 52. A drive wheel 72 is slideably mounted on shaft 71 as by bearing means 57A. A weight 74 is suitably affixed to drive wheel 72. As with the previously described embodiments, because of the pendulum action, that is, because of the pull of gravity on the weight 74 effectively hung from the bearing means 57A, drive wheel 72 remains in a non-rotating condition while the housing 50A rotates.

An electrical generator 24 is fixedly mounted to the cup-shaped cover of the housing 50A and rotates therewith. A friction driven wheel 25 ia attached to the generator 24 armature shaft 26. The friction driven wheel 25 is in operative communication with a drive ring 31A on the non-rotating drive wheel 72 causing the friction driven wheel 25 to rotate as the housing 50A and the vehicle wheel 4 rotate. In turn, this causes the armature shaft 26 to rotate thereby causing generator 24 to develop an electrical potential. As in the previous embodiments, the friction driven wheel 25 is smaller in diameter than the circular path in which it travels on the drive ring thereby effecting an overspeed relation with respect to the rotation of the vehicle wheel. The ratio between the diameter of the friction driven wheel and the circumference of the circular path determined the number of revolutions per second necessary to produce the desired level of electrical potential.

A transmitter 77 mounted on the inside cover of the housing 50A may be electrically connected, as at 78, to a tire pressure sensor 80, such as disclosed in U.S. Pat. No. 3,860,772 issued to Byrd, to monitor a pre-determined level of air pressure in the tire. As disclosed in Byrd, when the air pressure in the tire drops to a predetermined level, a valve stem 79 within the tire pressure sensor 80 is closed completing a selected circuit and thereby activating a warning signal transmitted via antenna 70 from the transmitter 77 to a receiver mounted on the body of the associated vehicle warning of a dangerous condition. If the tire pressure sensor switch is open, a situation normal signal is transmitted by antenna 70 to the receiver for the vehicle. Note that in this embodiment, generator 24, transmitter 77, antenna 70 and pressure sensor 80 all rotate with wheel 4.

In another embodiment of the invention, as shown in FIG. 9, the generator 24 is mounted within an toroidal-shaped cavity 81 on the inner side of the disc brake rotor 34 as at 83. The armature shaft 26 extends through a suitable housing cover 86 that environmentally protects the generator 24. The armature shaft 26 which is attached to the friction driven wheel 25 is in operative contact with a resilient drive ring 31B. Ring 31B is fixedly attached to that portion of the vehicle splash shield 90 that shrouds the disc brake rotor hub 34. Note that the splash shield 90 is stationary, while the vehicle wheel 4 and the generator 24 rotate. As the wheel 4 and generator 24 rotate, the friction driven wheel 25 and the armature shaft 26 rotate to thereby develop electrical potential.

As in the previous embodiments, the diameter of the friction driven wheel 25 is smaller that the circular path it travels on drive ring 31B thereby providing an overspeed relation between the revolutions of the driven wheel 25 and the generator shaft 26 as compared to the vehicle wheel 4. The generator 24 may power a suitable monitoring device 91 and a suitable signal transmitter 92 such as through leads 88. A transmitter antenna 93 is conductively connected to extend outside of the cover 86 and communicates with a receiving antenna 94 mounted on a nonrotating member of the vehicle such as on the splash shield 90 or elsewhere.

In another embodiment of the inventive system, as shown in FIG. 10A, the generator 24 is fixedly mounted within a grease cap 95. Grease cap 95 has circular side walls 96, a outer wall 97, and an open end 98 adapted to be conventionally mounted on the wheel hub 34. A special spindle nut 102 is mounted on the wheel spindle 103. Spindle nut 102 includes a turned diameter 102A and a hexagonal outer surface 104. A resilient drive ring 31D, formed such as of rubber, is attached to the turned diameter 102A of nut 102. The periphery of friction driven wheel 25 which is affixed to the generator armature shaft 26, engage the surface of drive ring 31D. The wheel spindle 103, spindle nut 102 and the drive ring 31D are non-rotating, whereas the grease cap 95 mounted on the rotor hub 34 rotates. The generator 24 which is mounted on the grease cap 95 also rotates thereby causing the friction driven wheel 25 to rotate on drive ring 31D and around the spindle nut 102 thereby activating the generator 24 to develop an electrical potential. The rotating generator 24 is electrically connected to rotating transmitter 41 which communicates via rotating antenna 93 to a receiver antenna located on the body of the vehicle. As above, the friction driven wheel 25 is of a different diameter than the circumferential path in which it travels to thereby produce an overspeed relation between the revolutions of the armature of shaft 26 and the rotation of the vehicle wheel 4.

In another embodiment of the invention, shown in FIG. 10B, which is generally similar to the embodiment of FIG. 10A, the generator 24 is fixedly attached to the spindle nut 102A. Spindle nut 102A is stationary as is the wheel spindle 103. The friction driven wheel 25 is attached to the generator 24 armature shaft 26 and is in operative communication with a drive ring 31E. Ring 31E is mounted on the inner surface of circular wall 96 of grease cap 95A which is generally similar to grease cap 95. The grease cap 95A and drive ring 31E rotate with the vehicle wheel 4. As above, as the friction driven wheel 25 rotates on the drive ring 31E the generator 24 develops an electrical potential.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed as the best mode contemplated for carrying out the invention, but that the invention will include all embodiments falling within the scope of the appended claims.

I claim:

1. An electrical energy generator means mounted within a housing, said housing mounted to a rotatable body such as a vehicle wheel, rotatable therewith comprising, in combination:

said housing being ring-shaped and having an outer circular wall, front and rear walls, and an interior wall forming a passageway for surrounding an axial member;

a bearing means having inner and outer races with said inner race fixedly mounted to said interior wall of said housing, and said outer race fixedly attached to;

an armature shaft for said generator;

a friction driven wheel fixedly attached to said armature shaft;

said generator means suspended as a pendulum for maintaining a substantially non-rotating condition while said housing and said vehicle wheel rotate;

a drive ring fixedly attached to a wall of said housing and in operative communication with said friction driven wheel to thereby cause said armature shaft to rotate during rotation of said wheel and housing and develop an electrical potential.

2. A system as in claim 1 wherein said friction driven wheel is of a smaller diameter than the diameter of the drive ring path in which said friction driven wheel is positioned to rotate thereby producing an overspeed relation relative to the revolutions of the rotating vehicle wheel.

3. A system as in claim 1 including a weighted holding bracket for supporting said generator means.

4. A system as in claim 1 wherein the diameter of said friction driven wheel and the diameter of the path in which said driven wheel is positioned to rotate controls the amount of voltage produced by said generating means.

5. An electrical energy generator for mounting to a rotatable body for rotation therewith, and comprising in combination:

a ring-shaped housing of essentially rectangular construction in cross section, including an outer wall, an inner wall, a top wall and a bottom wall, said bottom wall forming an interior passageway for surrounding a rotating shaft member;

a bearing means having an inner and outer race, and said inner race being fixedly attached to said bottom wall;

an electromagnetic potential generating means fixedly attached to said outer race;

an armature shaft for said generating means;

a friction driven wheel affixed to said armature shaft;

a resilient drive ring fixedly attached to said rear housing wall, said friction driven coaxially wheel being in operative engagement with said drive ring, and;

a weighted casing enclosing said generating means and suspended as a pendulum from said outer race to maintain a substantially non-rotating condition thereof, whereby rotation of said housing with said rotating body causes said drive ring to revolve said friction driven wheel actuating said electromagnetic potential generating means to develop electrical power.

6. A system as in claim 5 wherein said friction driven wheel is of a smaller diameter than the circular path in which the wheel rotates on said drive ring to produce an overspeed condition relative to the revolutions of a rotating body.

7. A system as in claim 5 wherein said ring-shaped housing is attached to grease cap and rotates therewith.

8. An electrical energy generator mountable within an inner annular cavity of the strengthening rib of a vehicle wheel for orbital rotation therewith and comprising, in combination:

a bearing having an inner and outer race, said inner race fixedly mounted within said inner annular cavity;

a drive ring bracket annular in shape, said outer race attached to said bracket;

said generator including a rotatable shaft;

a friction driven wheel fixedly attached to one side of said shaft;

a drive ring mounted on said drive ring bracket in operative communication with said friction driven wheel;

an electromagnetic potential generator slideably mountable on;

a mounting bracket;

an annular-shaped shield enclosing the open side of said inner annular cavity for enviromentally protecting said generator, said mounting bracket being attached to said shield, a pilot pin, a compression spring actively engaged between said generator and said shield guided on said pilot pin;

a counting wheel on said armature shaft for electronically counting rotations;

multiple protrusions positioned around said counting wheel, acting as a speed sensor;

an electrical pickup sensor in operative contact with said counting wheel;

a signal transmitter electrically coupled to said generator, said pickup sensor being electrically connected to said transmitter;

an antenna electrically connected to said transmitter;

a receiving antenna, located in a non-rotating part of said vehicle;

a weight means attached to said drive ring bracket attached to said outer race bearing to maintain said bracket in a substantially non-rotating disposition relative to the orbital rotation of said generating assembly and said vehicle wheel, whereby said friction driven wheel revolves in a path on said drive ring thereby causing said generating assembly to develop electrical energy for said transmitter.

9. A system as in claim 8 wherein said friction driven wheel being of a smaller diameter than the diameter of the circular path for which said friction driven wheel is positioned to rotate on said drive ring to thereby produce an overspeed condition relative to the revolutions of said vehicle wheel.

10. A system as in claim 8 wherein said compression spring maintains pressure on said generating means forcing said friction driven wheel to maintain operational contact with said drive ring.

11. A system as in claim 8 wherein said protrusions on said counting wheel comprise an exciter passing through a magnetic field for counting rotations and said pickup brush is a sensor.

12. An electrical energy generator mountable to a rotatable body, such as a vehicle wheel and comprising in combination:

a cylindrical-shaped housing comprising, a disc forming a wall, a cup-shaped cover enviromentally sealed to said disc;

a mounting screw fixedly attached and centrally located on the outer side of said disc wall for coaxially mounting on said vehicle wheel;

a shaft centrally attached to said disc wall within said housing;

a shaft support mounted on the inner side of said cup-shaped cover and receiving said shaft;

a bearing means;

a generator support platform rotatably journaled to said shaft by said bearing means;

an electromagnetic potential generating means held and supported by said platform;

an armature shaft for said generating means, a driven means comprising a sprocket disc, a driving means comprising a sprocket gear attached to said armature shaft and operatively coupled to said driven sprocket disc;

said sprocket disc having a plurality of spaced apertures engaging the teeth of said sprocket gear for driving said armature shaft and actuating said generating means to produce electrical power when said vehicle wheel rotates;

said generating means including;

a spring loaded brush holder, brushes and slip rings;

said brushes being in electrical communication with said slip rings, for conducting electrical energy to power a selected device;

a damping device to reduce oscillation of said generating means when the vehicle is in motion, said damping device including;

guide rods, a platform having rod receiving apertures therein, a bar that supports and slideably positions said guide rods in said platform holes, an arc-shaped weight affixed to said platform;

a resilient bumper on the top ends of said rods and attached immediately below said flat bar;

a resilient bumper on the bottom end of said rods contiguous said weight;

a compression spring on each rod position between said bumpers and the top of said platform, the center of gravity of said weight and said generating means being below the axis of said shaft and suspended as a pendulum to maintain said stationary generating means in a non-rotating condition while said wheel rotates with said housing.

13. A system as in claim 12 wherein said driven sprocket gear has a pitch diameter smaller than the diameter of the circular path in which it is positioned to rotate thereby creating an overspeed relation between the revolution of said sprocket gear and the revolution of said sprocket drive disc.

14. A system as in claim 12 wherein when said vehicle wheel bounces on irregular surfaces said damping device converts part of the forward movement of said wheel into an upward or downward motion due to the slideable mounting of said weight, thereby reducing oscillation and preventing the device from rotating.

15. A system as in claim 12 where said driven means is a friction driven wheel and said drive means is a drive ring.

16. A device for transforming mechanical energy into electrical energy, said device being mountable on a vehicle wheel for rotation therewith, and comprising in combination:

a circular-shaped rear wall;

a cylindrical-shaped housing consisting of a cup-shaped cover sealed to said rear wall;

a mounting screw fixedly attached to the exterior of said housing for mounting said housing coaxially on the vehicle wheel for rotating with said wheel;

a support shaft fixedly mounted on said rear wall and centrally located in said housing; and coaxial to said mounting screw;

a bearing means slideably mounted on said shaft;

a drive disc fixedly attached to said bearing means;

a resilient drive ring fixedly attached to said drive disc;

a weight means depending from said drive disc for maintaining a substantially non-rotating condition relative to the rotation of said wheel;

a electromagnetic potential generating means, fixedly mounted on the inner surface of said cup-shaped cover;

an armature shaft for said generating means;

a friction driven wheel attached to said armature shaft and operatively coupled with said drive ring;

a transmitter means mounted within said housing and electrically coupled to be powered by said generating means, transmitter antenna means mounted on said housing to transmit signals therefrom;

whereby said generating means rotates with said housing and said vehicle wheel while said drive disc and drive disc ring remains relatively stationary, and said friction driven wheel rotates on said drive disc ring causing an electrical potential to be generated by said generating means such as to power said transmitter means.

17. A device as in claim 16 wherein said friction driven wheel is of a smaller diameter than the diameter of the circular path in which said wheel rotates, and said drive disc thereby creating an overspeed relationship between the revolutions of said friction driven wheel and said drive disc.

18. A device as in claim 16 wherein a tire pressure sensor is operatively powered by said generating means.

19. A device as in claim 16 wherein said transmitting antenna comprises a shrouded metal cable.

20. A device as in claim 16 wherein said generating means rotates with said transmitter and said antenna and with said vehicle wheel.

21. A device as in claim 16 wherein said generating means, said transmitting means and said pressure sensor means rotate in unison allowing a direct, brushless electrical connection.

22. A device for transforming mechanical energy into electrical energy, said device being mountable in an annular cavity of a brake rotor hub of a disc brake system for rotation with a wheel of a vehicle and comprising in combination:

a housing for said generating means comprising side walls and a front wall cover, a portion of said brake rotor forming the rear wall of said housing;

an armature drive shaft for said generator passing through said housing wall cover;

a friction driven wheel attached to said drive shaft;

a stationary splash shield mounted on said vehicle;

said splash shield having an extended circular portion, a resilient drive ring fixedly attached to said circular portion of said splash shield, said friction driven wheel orbiting around and engaging said drive ring to revolve when said generating means rotates with wheel thereby causing the generating means to create an electrical potential;

a transmitter, mounted within said housing cover, electrical circuitry for connecting the generating means to power said transmitter, a transmitter antenna on said housing cover;

a receiving antenna located on non-rotating body of said vehicle such as the splash shield and being in R/F communication with said transmitter antenna.

23. A device as in claim 21 wherein said friction driven wheel is in small diameter and the diameter of the circular path in which it rotates on said resilient drive ring causing an overspeed relationship between the revolutions of said friction drive and said vehicle wheel.

24. A system as in claim 21 wherein said housing cover and said generating means is mounted eccentric to and orbits around the axis of rotation of said vehicle wheel.

25. A system as in claim 21 wherein said friction driven wheel is a sprocket gear and said splash shield hub has a series of holes equally spaced around said splash shield and is operatively coupled with the gear teeth in said sprocket gear.

26. A device for transforming mechanical energy into electrical energy and mountable on a rotatable body, such as a vehicle wheel, for rotation therewith, and comprising in combination:

a rotor hub for said wheel;

a cup-shaped grease cap having a side wall, a bottom wall and an open end, said cap being mountable on said rotor hub with its opening contiguous to said wheel and rotatable with said hub;

an electromagnetic potential generating means affixed on the inside surface of said side wall of said grease cap and rotatable with said cap;

an armature drive shaft for said generating means;

a friction driven wheel mounted on said drive shaft;

a nonrotating spindle for said wheel, a nonrotating spindle nut for said spindle, an outer portion of said spindle nut being circular, a drive ring on said circular outer portion of said spindle nut; said friction driven wheel engaging said drive ring to cause said armature shaft to rotate when said wheel and cap rotate to activate said generating means to develop electrical energy;

a signal transmitter electrically coupled to said generating means;

a transmitter antenna extending from said grease cap to enable R/F communication with a receiver antenna on the body of the vehicle.

27. A system as in claim 25 wherein said rotating friction driven wheel is a smaller diameter than the diameter of the circular path in which it travels on said drive ring causing an overspeed relationship with the revolutions of said friction driven wheel and said vehicle wheel.

28. A system as in claim 25 wherein the positioning of said generating means and said drive ring are interchanged, said generating means being fixedly attached to said spindle nut and non-rotating, and said drive ring being affixed to the wall of said grease cap.

29. A system as in claim 25, wherein said friction driven wheel is of a smaller diameter than the diameter of the circular path in which it rotates on said drive ring causing an overspeed relationship to the revolutions of said friction driven wheel and the revolutions of said vehicle wheel.

30. A system as in claim 25 wherein said generating means and said signal transmitter rotate in conjunction with each other thereby eliminating the necessity of electrical brushes and slip rings.

* * * * *